United States Patent [19]
Pelton et al.

[11] 3,904,524
[45] Sept. 9, 1975

[54] CONTAINER STRUCTURE

[75] Inventors: Sterling W. Pelton, Western Springs; William M. Lynch, Glen Ellyn, both of Ill.

[73] Assignee: Advanced Fibre-Glass, Ltd., West Chicago, Ill.

[22] Filed: June 11, 1973

[21] Appl. No.: 368,850

[52] U.S. Cl. .................. 210/94; 52/309; 52/475; 210/170; 210/513; 210/532; 220/9 F; 220/64; 220/71; 61/.5
[51] Int. Cl.² ................ B01D 35/00; E04C 1/00; B65D 25/18; B65G 5/00
[58] Field of Search .......... 210/83, 84, 94, 95, 109, 210/116, 170, 320, 540, 542, DIG. 21, 513, 210/521, 538, 532; 220/9 F, 64, 3, 63, 71, 72; 52/309, 615, 407, 474, 475, 739, DIG. 7; 117/27, 94; 137/236; 4/172.17; 61/.5, 1 R, 61/64; 156/78; 29/460

[56] References Cited
UNITED STATES PATENTS

| 483,697 | 10/1892 | Rich | 61/64 |
|---|---|---|---|
| 1,032,458 | 7/1912 | White | 210/540 UX |
| 1,672,583 | 6/1928 | Travers | 210/84 |
| 2,470,418 | 5/1949 | Verner | 210/DIG. 21 X |
| 2,607,727 | 8/1952 | Butler | 210/170 |
| 2,978,136 | 4/1961 | Enrenfreund | 220/9 F |
| 3,221,085 | 11/1965 | Rill et al. | 29/460 |
| 3,258,889 | 7/1966 | Butcher | 52/407 X |
| 3,391,038 | 7/1968 | Whitesides | 156/78 |
| 3,391,823 | 7/1968 | Tijms | 220/64 X |
| 3,828,506 | 8/1974 | Phillips | 52/475 |
| 3,833,122 | 9/1974 | Cook | 210/532 R |

*Primary Examiner*—Roy Lake
*Assistant Examiner*—Craig R. Feinberg
*Attorney, Agent, or Firm*—Haight Hofeldt Davis & Jambor

[57] ABSTRACT

An improved building or container structure including elongated support members defining a frame; closed cell foam panels interposed between said support members to enclose a space; and a seamless thermosetting plastic skin reinforced with glass fibers covering and bonded to the supports and the cellular structure.

12 Claims, 7 Drawing Figures

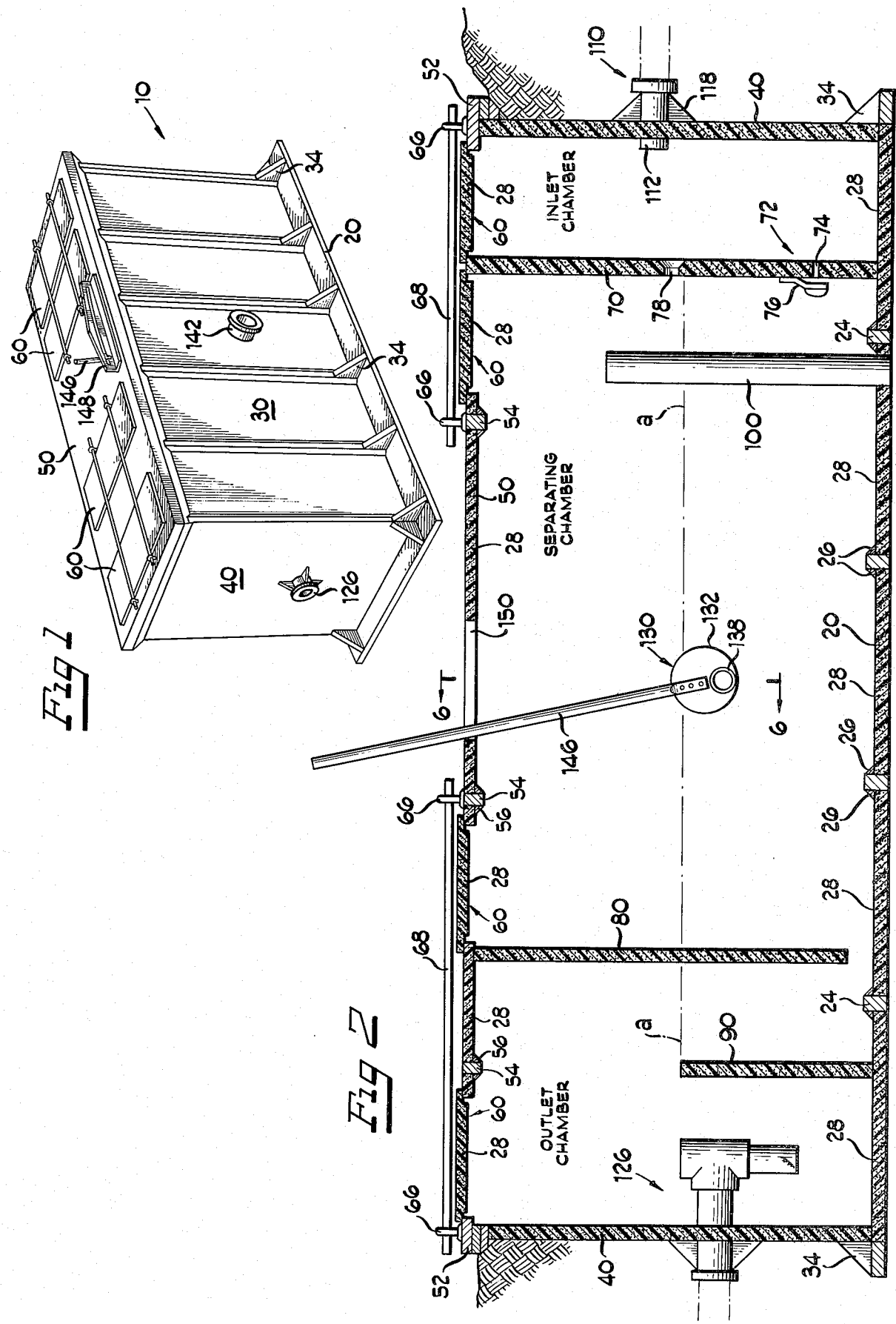

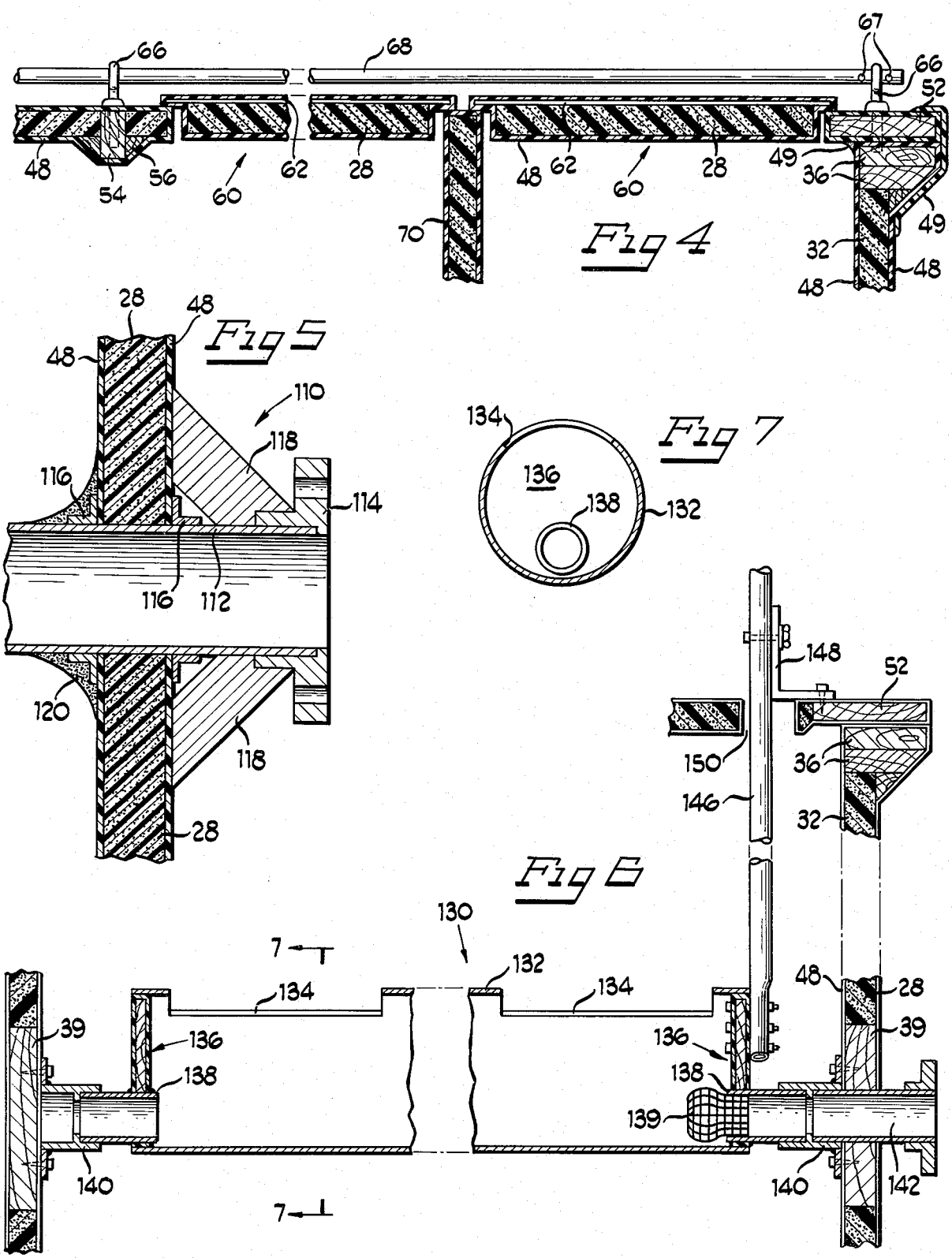

CONTAINER STRUCTURE

BACKGROUND OF THE INVENTION

This invention relates to building structures and containers. More particularly, it relates to an integral, seamless skin structure having particular adaptability where a high strength to weight ratio is required and where non-corrosive surfaces are desirable. One specific utilization is that of an underground storage tank, or an oil-water separator tank which is normally placed underground.

SUMMARY OF THE INVENTION

To provide a superior building structure the instant invention includes elongated frame members attached together to define a frame, closed cell foam panels interposed between the frame members to enclose a space, and a seamless thermosetting plastic skin reinforced with glass fibers mechanically bonded to the interior and exterior surfaces of the foam and frame members.

Accordingly, it is an object of this invention to provide a building structure having a sandwich type cross section in which the inner and outer skins act as flanges joined together by a foam web which resists shear. Additionally, it is an object of the instant invention to provide a very economical structure having the following desirable features:

1. A high strength to weight ratio;
2. Ease of transportation from the manufacturing site to the utilization site;
3. Minimum mechanical joints;
4. A highly impervious, non-corrosive wall structure; and
5. Seamless internal and external protective skins.

Too, another object of the instant invention is to provide an underground storage tank or an oil-water separating tank, which is not subject to corrosion by the soil or by other natural elements if used above ground. Finally, it is an object of the instant invention to provide a container which can be utilized as an underground oil-water separator having an integral anchor to preclude the container from being buoyed out of the ground by underground water pressure and which has very substantial resistance to bending deflections which may arise from soil and/or water pressures.

DESCRIPTIONS OF THE DRAWINGS

The manner in which the objects of this invention are attained will be made clear by consideration of the following specification and claims when taken in conjunction with the drawings, in which:

FIG. 1 is a perspective view of a preferred embodiment of my invention;

FIG. 2 is a side elevational view taken in section along a longitudinal center line of the preferred embodiment;

FIG. 4 is an enlarged view in section of a top member of the preferred embodiment taken along a longitudinal center line;

FIG. 5 is an enlarged side elevational view of a portion of the sidewall of the preferred embodiment of FIG. 1;

FIG. 6 is a side elevational view in section of an oil skimming device used in conjunction with the preferred embodiment, this section being taken along the lines 6—6 of FIG. 2; and FIG. 7 is a side elevational view taken along the lines 7—7 of FIG. 6.

DETAILED DESCRIPTION

Figure 3:
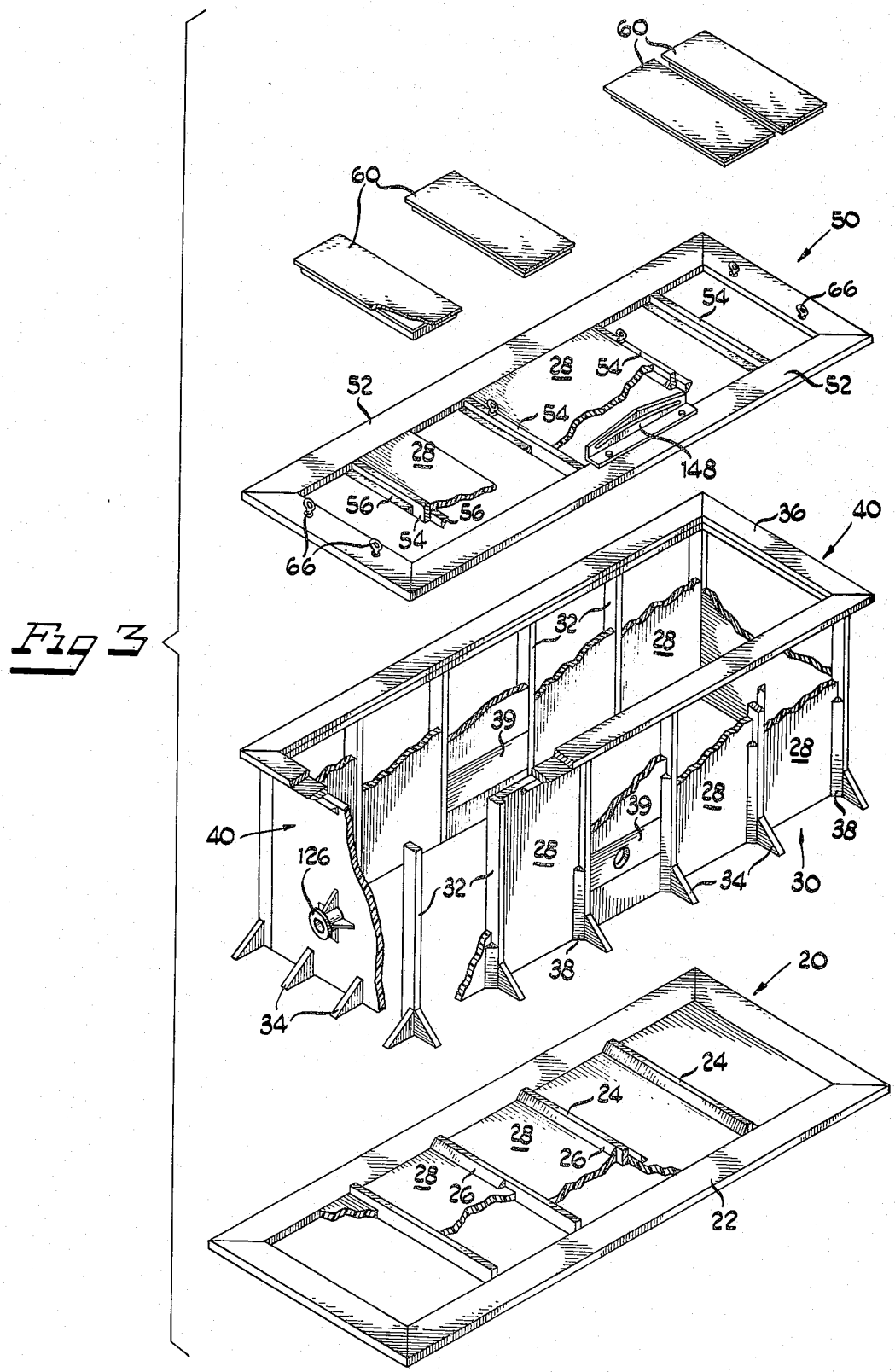
FIG. 3 is an exploded view of the preferred embodiment of FIG. 1 depicting the major components in various stages of manufacture.

Although the invention may take many forms, the drawings illustrate its preferred adaptation as an underground tank, more particularly, an oil-water separating tank. As illustrated in FIG. 1, the tank 10 includes a bottom member 20, upstanding sidewalls 30, and endwalls 40 and a top cover member 50. As shown in FIG. 2, the tank 10 is depicted in its underground environment in which it is adapted to receive an oil-water mixture through an inlet 110 into an inlet chamber. Such oil-water mixtures often occur adjacent refinery storage areas or near loading docks where they are washed into a drain connected by a conduit (not shown) to the inlet 110. From the inlet chamber, the oil-water mixture passes through a reaction jet 72 (subsequently explained) into a separating chamber where the oil is skimmed from the surface of the water by a skimming device 130, with the separated oil being extracted from the container through conduit 142 (FIG. 1) into a separate storage reservoir (not shown). The water subsequently passes into an outlet chamber, and then through a pipe outlet 126 whereby the water is absorbed by the soil, or may be merely collected in another reservoir.

Building structures utilized as storage or separating tanks are usually prefabricated at a plant and then subsequently transported for various distances for installation at the users location. Thus, prior to installation such containers must be able to withstand rigorous treatment during transportation to the site. Subsequently, when installed, the tank 10 is subjected to various forces. As illustrated in FIG. 2, soil forces act against the sidewalls 30 and end walls 40 to apply bending loads thereto, while underground moisture or water imposes a buoyant force upward on the container. Simultaneously, fluid within the container may exert pressures outwardly against the sidewalls and end walls. Too, the exterior and interior skins of the container are acted upon by various chemicals which are often very corrosive.

Accordingly, the specific structure of these tanks is appropriately designed to withstand all of these forces. Such is best illustrated in FIG. 3, and takes the form of wooden frame members joined together by staples or nails. Interposed between the frame members are panels, preferably formed of a closed cell, high density polyurethane foam. To form a rigid sandwich-type construction, a thermosetting plastic, reinforced with glass fibers is then sprayed upon the exterior and interior surfaces so as to present a smooth, corrosion resistant, seamless interior and exterior surfaces. As subsequently explained, the thermosetting plastic will form a very strong mechanical bond with the foam panels and the wooden frame members to result in unique features.

With particular reference to FIG. 3, the details of the tank and its sandwich construction are fully depicted. For example, the bottom member 20 comprises a rectangular frame formed of 2 by 8 inch wooden members joined together by nails or staples. Extending between the longitudinal members of the frame 22 are cross pieces 24 comprised of 2 by 4 inch lumber designed to provide additional rigidity to the bottom member. Interposed between these cross members 24 and the rectangular frame 22 are, preferably, high density, closed cell, polyurethane foam panels 28. These panels are merely stapled into place so as to complete the bottom member 22. Additionally, fillets 26 may be tacked to the 2 by 4 inch cross members 24 adjacent the top edge thereof so as to hold the foam panels 28 in place. Too, these fillets also provide a smooth transition for the thermoplastic film subsequently sprayed onto this bottom surface to form a skin so as to avoid sharp angles in its surface. However, prior to the application of the skin material, the remainder of the unit is assembled.

Such includes sidewalls 30 and end walls 40. These wall members are formed of 2 by 4 inch pieces of lumber vertically placed upon the rectangular frame 22 of the bottom member 20. Preferably, the vertical members are attached such that their inside wall is in vertical alignment with the inner edge of the rectangular frame 22. Subsequently, gussets 34 are interposed between the vertical studs 32 and the rectangular frame 22 as depicted in FIGS. 1 and 3. Again, high density, closed cell, polyurethane foam panels 28 are interposed between these vertical members to define an enclosed space or tank 10. Too, fillets 38 attached to the vertical members 32 provide supporting structure for panels 28. At the top of the vertical members 32 is a top plate 36 which is best seen in FIGS. 3 and 4. This top plate may comprise two 2 by 8 inch pieces of lumber nailed or otherwise tacked to the vertical members 32 as depicted in FIG. 4. Preferably, the lower piece of lumber has its outer edge cut at a 45° angle with the material removed being used as a fillet, and additional support between the vertical members 32 and the top plate 36. Finally, it should be noted that intermediate the sidewalls 30 are placed two cross members 39 which are utilized to support the oil skimming device 130, subsequently explained.

Finally, a top closure member having generally the same construction as the bottom member is formed of a rectangular frame 52 comprising 2 by 8 pieces of lumber joined together as indicated in FIG. 3. Additionally, cross members 54 interconnect the longer members of the frame 52, while foam panels 28 are interposed to complete the top surface. If utilized as an underground storage tank, the openings between some of the cross panels may be closed with covers 60 which are more thoroughly depicted in FIG. 4. These covers 60 may comprise plywood sheets 62 which are large enough to cover the horizontal openings between those cross members 54 utilized as openings. Subsequently, foam panels 28 are attached to the interior surface of the cover 60 in any convenient member such as by stapling or nailing, etc.

In the preferred form of assembly of the instant invention, the sidewalls 30 and the endwalls 40 are attached to the bottom member 20 and at that time, the thermosetting plastic is applied to all of the exposed interior and exterior surfaces. Thus, a thermosetting resin reinforced with glass fibers is sprayed upon the entire surface to form the seamless internal and external skin 48. (See FIGS. 4, 5 and 6). It has been found that such skins, when sprayed upon the frame members, form an excellent mechanical bond therebetween and provide a very strong sandwich structure. In the same manner, the thermosetting plastic with reinforced glass is applied separately to the top member 50 and to the covers 60.

After the plastic is cured the pieces are trimmed so as to present a more desirable, pleasing appearance, and the top member 50 is then placed upon the top panel 36 of the side and end walls, 30 and 40, respectively. Subsequently, a second coat of thermosetting plastic 49 is then sprayed around the junction of the top member 50 and the top panel 36 to form a good mechanical bond between these members and a seamless skin thereover. Since the covers 60 are removable, they may be put in place in the horizontal openings of the top member 50 at any time.

As indicated, the materials other than lumber which are used include a foam panel, and a thermosetting plastic reinforced with glass fibers. Preferably, the foam panels are precut for placement into the rigid frame member and have a desired thickness of approximately 2 inches. Preferably, these foam panels are a high density (4 pounds per cubic foot), closed cell, polyurethane foam structure. One foam which has been found quite acceptable is that commercially supplied by Owens-Corning Fiberglas Corporation under Product Code 40 W 80118 and referred to as Type 75 urethane board. The reinforced plastic is applied by conventional "spray up" techniques well known in the industry. Preferably, the plastic is a polyester resin which is mixed with a catalyst in the spray gun to initiate the cross linking reaction as the liquid resin and the catalyst are applied to the surfaces of the building structure by the spray gun. The gun also applies chopped strands of continuous roving of glass fiber to the surface in a manner as to impregnate the strands within the liquid resin such that upon curing a reinforced plastic surface results. Obviously, any plastic resin which can be applied by the spray up technique is acceptable in forming the outer plastic skin. However, polyester resins have been found to be especially desirable for building structures, since they possess the advantage of good mechanical, chemical and electrical properties while, at the same time, afford dimensional stability. Of the polyester resins commercially available, one should be selected which will best serve the particular use or environment of the structure. When utilized as an underground tank it has been found that the Chemical Resistant Resin, No. 510 P, commercially sold by the Hooker Chemical Co. of North Tonawanda, N.Y., is most acceptable. A preferred catalyst is Lupersol DDM sold by Lucipol Division of Pennwalt Corp. of Buffalo, N.Y., which is a methyl ethyl keotone peroxide solution. Preferably, the percentage of glass fibers to the resin is approximately 30% glass fibers by weight. Finally, a surface coat of resin may be applied to the exterior surface to enhance its appearance and weathering capability. Such may include conventional gel coats such as Chemical Resistant Gel Coat No. V-3016 supplied by Ferro Corp. of Cleveland, Ohio.

When a particular building structure is to be utilized as an oil-gas reservoir, partition panels 70 and 80 (see FIG. 2) formed of foam panels sprayed with a glass reinforced resin are placed in the interior of the tank 10 so as to divide it into three separate chambers, including an inlet chamber, a separating chamber and an outlet chamber. Additional resin may be sprayed at the intersection of the partitions and the side walls to rigidly hold them in place. On the end wall 40 adjacent the inlet chamber is placed an inlet conduit 110 more thoroughly depicted in FIG. 5. This inlet includes a conduit 112 which is merely inserted through an aperture placed in one of the foam panels 28. To support the conduit 112, a fiberglass mat is "wet out" or fully impregnated with a polyester resin-catalyst solution and laid circumferentially about the conduit adjacent the skin 48 on the interior and exterior. Upon curing, the impregnated mat forms a rigid annular ring 116 having flanges parallel to the surface of conduit 112 and the side walls. Additionally, gussets 118 are interconnected between the exterior wall or skin 48 and the conduit 112, with an annular flange 114 being joined to the end of the conduit to permit attachment to another infed conduit delivering the oil-water mixture into the reservoir. Finally, an additional quantity 120 of thermosetting plastic and reinforced with glass fibers may be applied at the intersection of the conduit 112 and the inner and outer surfaces of end wall 40.

Thus, fluid may be directed into the inlet chamber which is isolated from the separating chamber by a partition 70 also formed of the high density, polyurethane foam panels and frame members covered with a plastic skin material. Near the bottom of the partition 70 is a reaction jet 72 which takes the form of an orifice 74 through the panel, and a cup-shaped member 76 attached to the opposite side of partition 70. Thus, as the oil-water mixture in the inlet chamber rises above the reaction jet 72, the mixture flows through the orifice and against the cup-shaped member 76, which helps to separate the oil from the water. Alternatively, a second aperture 78 may interconnect the inlet and separating chambers to accommodate larger quantities of fluid. In the separating chamber, the oil will float to the top of the water level due to its lesser density. The water itself is free to flow past the separating chamber underneath the second partition 80 into an outlet chamber, the partition being of generally the same construction as the remainder of the unit. Within this outlet chamber is a third partition 90 which extends across the bottom portion of the reservoir and establishes the water level within the separating chamber and inlet chamber (indicated by the dotted line a—a). Should the water rise above the height of the partition panel 90, it is free to flow over same, and out an outlet conduit 126 similar in construction to the inlet conduit 112. If desired, a vertically adjustable panel (not shown) may be attached to the partition 90 such that the water height (a—a) may be raised or lowered.

The oil may be removed from the surface of the water in the separating chamber by various means. Often suction pumps are utilized for this purpose. However, a preferred skimming device 130 is illustrated in FIGS. 2, 6 and 7, and takes the form of a relatively large pipe member 132 extending between the sidewalls 40 of the tank. This pipe 132 has an arc 134 thereof cut out, the cut-out extending for a major portion of the length of the pipe 132. The ends of the pipe 132 are closed, preferably by annular wood inserts covered with a thermosetting plastic to prevent deterioration thereof.

Conduits 138 extend from the lower portion of these end plates 136 outwardly to pivotally mount the skimming device 130 within flange joints 140, the flange joint 140 on the right side wall (as viewed in FIG. 6) being attached a discharge conduit 142 which may be further connected to an oil reservoir. Preferably, the flange joints 140 are mounted by bolts or screws, as indicated, into the cross panels 39 which are mounted on side walls 30 of the container. If desired, a screen unit 139 may be utilized to preclude stoppage of the conduits 138 and 142 by trash and other debris.

Being pivotable, the skimming unit 130 can be used to control the depth of oil collected upon the surface of the water. Thus, by rotating the pipe 134, the edges of the cut-out are raised or lowered. This pivotal motion is effected by the use of a control handle 146 which is bolted or otherwise connected to the end plate 136 as indicated in FIG. 6. It extends outwardly and through a slot 150 of the top panel member 50. To hold the handle 146 in a specific location, a mounting bracket 148 is carried upon the frame 52 of the top panel 50. This bracket may be L-shaped in cross section and carry an arch-shaped longitudinal slot therein (unnumbered) by which a bolt may rigidly lock the operating handle in a given position. Such will establish the thickness of the oil layer collected upon the top of the water surface. Such is merely one embodiment of an oil skimming device. Others may be found appropriate.

Finally, with further reference to FIG. 2, a standpipe 100 having a vertical height greater than that of the oil or water level within the tank extends through the bottom member 20 and is appropriately located below one of the horizontal openings in the top member 50 which is covered by a panel 60. One purpose of this standpipe is to provide visible indicia of the buoyant force which the soil water may impose against the bottom of the storage tank 10. Thus, if the water level within the standpipe 100 extends above the water level within the tank, the user will know that there is a substantial buoyant force operating against the tank and it should not be emptied for cleaning. Otherwise, it might be buoyed out of the ground. A second purpose of the standpipe is to act as a relief valve. Thus, if the water pressure would otherwise be sufficient to force the tank out of the ground, it is relieved by permitting the water to flow into the tank through the standpipe and out the conduit 126. Additionally, if the partition 90 is provided with an adjustable top member, it can be raised so that the water level in the seaprating chamber can also be elevated, thus causing a greater separating force which will oppose the buoyant force attempting to force the tank out of the ground. Another means of opposing the buoyant force is the rectangular frame 22 of the bottom member 20 which extends outwardly beyond the side walls of the container 10 to act as an anchor. With further reference to the disclosure of FIG. 4, it should be noted that the covers 60 closing the rectangular apertures of the top member 50 may be held down by elongated rods 68 which pass through eyelets 66 mounted in the wooden cross members. To hold the elongated rod 68 in position, pins 67 may be disposed at one end of the rod on each side of the eyelet 66.

While the preferred embodiment has taken the form of an underground tank, specifically an oil-water separating tank, this structure has many varied uses and is most appropriate for outside building structures. Clearly, apertures for doors and windows may be formed within the frame structure and such will provide a very rigid, high strength building with excellent insulating properties.

Accordingly, a unique building structure having various uses has been proposed. Such includes or accomplishes all of those desirable features previously identified. In addition, it is pointed out that there is a noticeable lack of mechanical interconnections between the various parts because the plastic reinforced skins form the major interconnection between the entire unit. This interconnection provides a very rigid and strong mechanical bond between the side walls 30 and end walls 40 on both the interior and exterior surfaces. Consequently, the elongated wall acts more like a beam with fixed supports thus eliminating or minimizing the flexing thereof in response to external forces. Too, no forms or molds are utilized in the manufacture of the structure and hence fabrication costs are minimized.

We claim:

1. A fluid separating container comprising:
   a. a flat bottom frame formed of elongated wooden members;
   b. side frames formed of elongated wooden members, attached to and extending upward from said bottom frame to define a space, said bottom member extending outwardly from said defined space and said side frames to define an anchor;
   c. a top frame including a removable cover panel covering said side frames;
   d. high density, closed cell, polyurethane foam panels attached to and carried by said frames to enclose said space;
   e. a seamless, thermosetting plastic skin reinforced with glass fibers covering and mechanically bonded to the interior and exterior surfaces of said frames and said panels;
   f. partitions within said frame defining an inlet chamber, separating chamber and outlet chamber, said chambers having an inlet for receiving fluids of different densities, and an outlet for the fluid of higher density; and
   g. means within said container for providing visual indicia of the buoyancy force exerted on said container, and for acting as a relief valve to limit such force.

2. An improved oil water separator structure having a bottom member, upstanding sidewalls and a top member, one of said members having an opening adapted to receive a closure, said structure comprising:
   a. elongated supports assembled to define a frame structure and for mounting foam panels to enclose said structure;
   b. high density cellular foam panels interposed between said supports for accepting shear stresses applied to said building structure; and
   c. a seamless thermosetting plastic reinforced with glass fibers covering and bonded to the interior and exterior surfaces of said frame structure and cellular structure for forming internal and external skins and for bonding said supports and said panels to each other and to said skin to minimize bending deflections of said structure.

3. A device as recited in claim 2 in which said oil-water separator includes:
   a. partitions within the interior of said structure to define three chambers including a first chamber means for receiving an oil-water mixture, a second chamber means for separating said oil and water, and a third chamber means for collecting said water; and
   b. conduit means connected to said first, second and third chamber means for respectively receiving an oil-water mixture, exhausting oil from the separating chamber means and water from the third chamber means.

4. A device as recited in claim 3 in which:
   a. a horizontal support extends outwardly from at least one sidewall adjacent the lower portion thereof for serving as an anchor when the structure is implanted in the soil.

5. A device as recited in claim 3 including:
   a. oil extraction means pivotally mounted in said second chamber means for selectively establishing the depth of oil to be accumulated.

6. An oil-water separator having a rectangular bottom, upstanding sidewalls and a top member, said separator comprising:
   a. elongated support members assembled to define a frame structure of said separator, said frame further defining a bottom member extending outwardly from said separator for serving as an anchor;
   b. sheets of lightweight core material interposed between said support members for encapsulating the space defined by said support materials;
   c. partitions formed of elongated members and sheets of core material within said frame structure to define chambers within said encapsulated space, said chambers including a first chamber for receiving an oil-water mixture, a second chamber permitting gravitational separation of oil from water, and a third chamber for collecting said water;
   d. a thermosetting plastic reinforced with glass fibers covering and bonding said interior and exterior surfaces of said frame structure, said partitions and said sheets into a unitary structure forming a fluid impervious interior and exterior skin; and
   e. means for connecting conduits to said separator for delivering an oil-water mixture to said separator and for discharging oil and water from said separator.

7. An apparatus as recited in claim 6 in which said supports are formed of wood and said core is formed of high density cellular foam.

8. An oil-water separator comprising a bottom member, upstanding sidewalls and a top member, said separator comprising:
   a. elongated frame members assembled to define a frame structure of said separator;
   b. said frame members carrying fillet means for receiving and supporting panels therebetween and for avoiding sharp angles in exterior or interior surfaces of said separator;
   c. panels of a cellular core material interposed between said frame members to enclose the space defined by said frame members; and
   d. a reinforced thermosetting plastic skin covering and bonded to the interior and exterior surfaces of said frame members, said panels and said fillet means for bonding said members and said panels into a unitary structure.

9. An apparatus as recited in claim 8 in which said separator includes:
   a. partitions within the interior of said structure to define at least three chamber means including a first chamber means for receiving an oil-water mixture, a second chamber means for separating said oil and water, and a third chamber means for collecting said water; and b. conduit means connected to said first, second and third chamber means for respectively receiving an oil-water mixture, exhausting oil from the separating chamber means and water from the third chamber means.

10. An apparatus as recited in claim 9 in which said partitions comprise:
   a. panels of core material supported by frame members; and
   b. said reinforced plastic skin covers said partitions and bonds said partitions to the walls of said separator.

11. An oil-water separator comprising a bottom member, upstanding sidewalls and a top member, said separator comprising:
   a. elongated frame members assembled to define a frame structure of said separator;
   b. said frame members carrying fillet means for receiving and supporting panels therebetween and for avoiding sharp angles in exterior or interior surfaces of said separator;
   c. panels of a cellular core material interposed between said frame members to enclose the space defined by said frame members, the interior surface of said panels being flush with the inner surfaces of said frame members, and the exterior surface of the panels abutting said fillet means, said fillet means and the exterior edges of said frame members extending outwardly beyond said panels providing a ribbed appearance to the exterior surface of said separator and for providing additional resistance to shear; and
   d. a reinforced thermosetting plastic skin covering and bonded to the interior and exterior surfaces of said frame members, said panels and said fillet means for bonding said members into a unitary structure.

12. An oil-water separator adapted to be placed underground comprising:
   a. elongated support members of a cellular material defining a frame for said separator;
   b. cellular panels mounted between and coplanar with adjacent support member to define an enclosed container space; and
   c. a plastic skin reinforced with glass fibers covering and bonded to the interior and exterior supports and said cellular structure to form an impervious lightweight container, said skin bonding said panels to said support members and to itself to form a unitary structure.

* * * * *